Jan. 16, 1951 N. C. PICKERING 2,538,164
ELECTROMAGNETIC SOUND REPRODUCER
Filed July 8, 1946
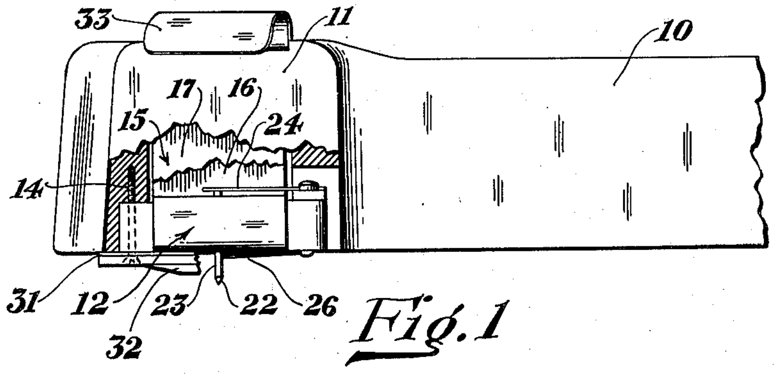
Fig. 1
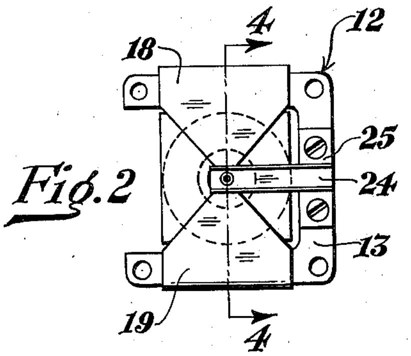
Fig. 2
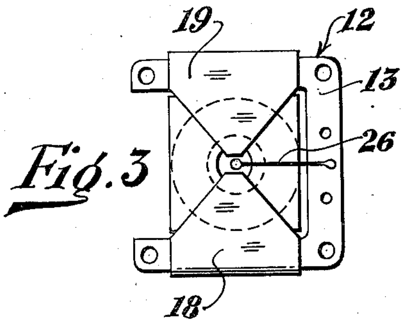
Fig. 3
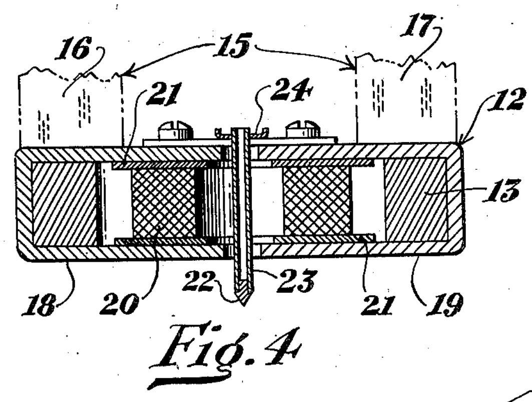
Fig. 4
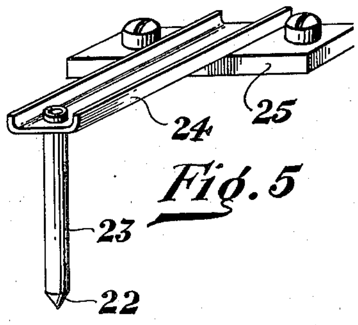
Fig. 5
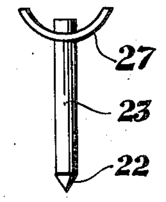
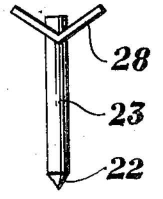
Fig. 6 Fig. 7
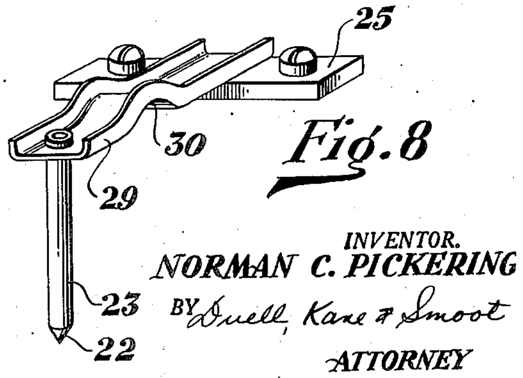
Fig. 8
INVENTOR.
NORMAN C. PICKERING
BY Duell, Kane & Smoot
ATTORNEY Patented Jan. 16, 1951 2,538,164

UNITED STATES PATENT OFFICE 2,538,164

ELECTROMAGNETIC SOUND REPRODUCER

Norman C. Pickering, Rockville Centre, N. Y., assignor to Pickering Associates, Inc., Oceanside, N. Y., a corporation of New York Application July 8, 1946, Serial No. 681,800

4 Claims. (Cl. 179—100.41)

This invention relates to an improved sound reproducer particularly a phonograph reproducer for use with laterally cut records.

It is an object of the present invention to provide an improved sound reproducer which accurately reproduces the sound recorded on a record with a minimum of distortion and with a minimum amount of wear on the record.

Sound reproducers of this type employ a moving system having a stylus point which engages the groove in the record. The lateral cut modulations in the groove cause displacement of the stylus and the vibrations or displacements of the stylus are translated into electrical impulses or voltages. At any given frequency the force required to displace the stylus point is dependent upon the following factors: (1) the force required to deflect the centering spring used in centering the moving system; (2) the force required to accelerate the mass and (3) the force required to overcome the damping action (if any is present).

Since the force applied to the stylus point to cause its displacement or vibration is applied by means of the inclined plane of the grooved wall of the record (which is disposed at an angle of approximately 45°), the force required to hold the stylus point in contact with both groove walls or the tracking pressure must be greater than the reaction force of the stylus point to the modulations of the groove.

It will be appreciated that the wear on the record is closely related to the tracking pressure and accordingly in carrying out my invention I reduce the mass of the moving system to a low value. I also provide a centering spring in the form of a cantilever spring which readily permits compliance of the stylus point in a lateral direction to the modulations of the record groove and also permits vertical compliance but at somewhat greater stiffness. In addition distortion is minimized by providing a stylus support in the form of an armature in which the ratio of stiffness to mass is high so that the armature is light but nevertheless stiff so as to move as a whole without flexing and in which the armature is made of a material in which the flux density is exactly proportional to the magnetizing force.

Other objects will be apparent from the following description of the drawing in which—

Fig. 1 is a side elevational view of a portion of a reproducer arm and head with a portion of the head broken away to reveal the reproducer assembly therein;

Fig. 2 is a top plan view of the reproducer assembly removed from the reproducer arm and head;

Fig. 3 is a bottom plan view of the reproducer assembly;

Fig. 4 is a sectional view in the direction of the arrows on the line 4—4 of Fig. 2 showing a portion of the magnet in dotted lines;

Fig. 5 is a perspective view of the moving system employed in my improved reproducer;

Figs. 6 and 7 are views of modified types of cantilever spring sections which may be used in my reproducer; and Fig. 8 is a perspective view showing a further modified type of cantilever spring.

In Fig. 1 I have shown a portion of a reproducer arm 10 having an integral head 11 formed at the end thereof and which serves to house my improved sound reproducer assembly 12. The reproducer arm may be of conventional construction and may be mounted and counterweighted in the usual manner (not shown). If desired the head may be provided with a small finger engaging handle 33 whereby it may be elevated and shifted from operative to inoperative position.

My improved reproducer assembly comprises a moving system and also a fixed portion embodying a generating system or coil. The fixed portion of the reproducer assembly comprises a generally U-shaped frame 13 made of a non-magnetic material such as brass which may be secured in the lower portion of the head of the reproducer arm by suitable means such as screws 14 extending through apertures formed in the four corners thereof. A permanent magnet 15 is disposed in the upper part of the head with its poles 16 and 17 extending downwardly into engagement with pole pieces 18 and 19 respectively. The pole pieces are made of suitable magnetic material and are of similar construction being of generally U-shape in longitudinal section as shown in Fig. 4 and being arranged to straddle opposite sides of the supporting frame 13. Both faces of the pole pieces taper towards the inner ends and terminate a short distance from each other leaving a small gap in the magnetic circuit in which the armature is disposed as shown most clearly in Figs. 3 and 4. Fixedly supported between the upper and lower section of the pole pieces and insulated therefrom as shown at 21 is a current generating element in the form of coil 20 having a central opening which is concentric with respect to the center point of the gap.

The moving system in my improved generator is of relatively simple and light construction and consists of a pointed stylus 22 supported in the end of an armature 23 which in turn is fixedly and rigidly supported near the free end of cantilever spring 24 which is mounted at its opposite end on a suitable supporting plate 25 attached to the frame 13.

As previously stated it is desirable that the mass of the moving system be reduced to a minimum and it is also desirable that the stylus supporting armature be relatively stiff. For this purpose I make the armature of tubular construction so that the ratio of stiffness to mass is relatively high. As shown, the cantilever spring is mounted across the top of the assembly so that the armature 23 projects downwardly and is centered in the coil and gap between the pole pieces. The stylus projects downwardly beneath the assembly so that it may engage the groove of a record. When the stylus is displaced laterally by the modulations of the record groove it moves towards one or the other of the pole pieces causing a flux in the armature which in turn cuts the coil and causes electrical impulses or voltage therein. The coil is connected in the usual manner by wires (not shown) extending through the reproducer arm to an amplifying and loud speaking system.

To obtain a rigorous or accurate translation of the record groove modulation into electrical signal output, the change in flux should be exactly proportional to the stylus point displacement, and in this connection, I have found that the armature should be made of a material in which, over the usable range, the flux density is exactly or almost exactly proportional to the magnetizing force. For this purpose, an alloy of nickel and iron in which the nickel content ranges from 45 to 55% by weight the balance being of iron is very satisfactory.

I have also found that the suspension for the armature must be such as to permit compliance in both a lateral and a vertical direction, the ratio between the two being controlled so that at the stylus point the resistance to lateral compliance is considerably less than the resistance to vertical compliance. In the usual frequency ranges encountered I have found that satisfactory results are found by maintaining a ratio of lateral to vertical compliance at the stylus point of approximately 8 or 10 to 1. The desired results can be obtained by fixedly mounting the armature near the free end of a cantilever spring such as that indicated at 24 which is generally channel-shaped in cross section. This type of spring permits flexing in a vertical direction and also permits displacement of the stylus in a lateral direction by twisting of the spring or section. This arrangement has the additional advantage of offering high resistance to displacement of the stylus in a direction parallel to the cantilever spring. Additional resistance to displacement in a longitudinal direction can also be obtained by providing a tie wire or cord 26 which extends between the armature and the under surface of the supporting frame 13.

Variations in the cross sectional shape of the cantilever spring, maintaining the general channel section, are indicated at 27 and 28 respectively in Figs. 6 and 7. These sections offer the same advantage of permitting displacement of the stylus in both vertical and lateral directions, but offering greater resistance at the stylus point to vertical than to lateral compliance.

Fig. 8 indicates a further modification in which a channel shaped cantilever spring 29 is provided with a curved or offset portion 30 so as to increase its compliance in a vertical direction. This arrangement can be used to reduce the stiffness of the spring to vertical flexing in those cases where it is desired to have greater vertical compliance of the stylus point.

In using my improved reproducer it is assembled in a reproducer arm in the manner shown and previously described and the leads from the coil are extended through the arm and connected to an amplifier in the usual manner. A gasket 31 and cover 32 may be attached over the assembly and open end of the head as shown so as to protect the reproducer. The reproducer is used in the usual manner with the stylus point in engagement with a lateral cut record groove. Due to the relatively small mass of the moving system, the high stiffness to weight ratio of the armature, the characteristics of the armature material, and the nature of the cantilever mounting, an accurate translation of the modulations into electrical signal output is obtained with a minimum wear on the record.

Modifications may be made in the illustrated embodiment of my invention without departing from the invention as set forth in the accompanying claims.

I claim:

1. In a sound reproducer a moving system comprising a cantilever spring which is substantially channel shaped in cross section throughout its effective length and having a stylus supported adjacent the free end thereof with the stylus point spaced a short distance beneath the spring, said stylus point having substantially no compliance in a direction parallel to the longitudinal axis of the spring but having compliance in a vertical direction due to the flexing of the spring and in a lateral direction due to the twisting of the spring around its longitudinal axis, the compliance in a lateral direction being substantially greater than the compliance in a vertical direction due to the channel shape of the spring.

2. In a sound reproducer, a moving system comprising a cantilever spring which is substantially channel shaped in cross section throughout its effective length for supporting and centering the system, an armature fixedly secured adjacent the free end of the spring and depending downwardly therefrom, and a stylus mounted adjacent the lower end of the armature, the stylus having substantially no compliance in a direction parallel to the longitudinal axis of the spring but having compliance in a vertical direction due to the flexing of the spring and in a lateral direction due to the twisting of the spring around its longitudinal axis, the compliance in a lateral direction being substantially greater than the compliance in a vertical direction due to the channel shape of the spring.

3. In a sound reproducer, a moving system comprising a cantilever spring substantially channel-shaped in cross section throughout its effective length for supporting and centering the system, an armature consisting of a tubular member of substantially uniform cross-sectional size and shape throughout its effective length made of magnetic material mounted at one end adjacent the free end of the spring, and a stylus mounted adjacent the other end of the armature, the stylus having substantially no compliance in a direction parallel to the longitudinal axis of the spring but having compliance in a vertical direction due to the flexing of the spring and a lateral direction due to the twisting of the spring around its longitudinal axis.

4. In a sound reproducer, a fixed system comprising a permanent magnet, pole pieces arranged to provide a gap in the magnetic circuit, and a coil with a center opening disposed adjacent the pole pieces with the center of the opening in alignment with the center of the gap; and a moving system comprising a cantilever spring which is channel shaped in cross section throughout its effective length mounted at one end adjacent the fixed system, a tubular armature mounted at one end adjacent the free end of the cantilever spring and depending downwardly through the center of the gap and the coil, said armature being made of magnetic material and being of substantially constant cross-sectional size and shape throughout its effective length and a stylus mounted adjacent the lower end of the armature said stylus having substantially no compliance in a direction parallel to the longitudinal axis of the spring but having compliance in a vertical direction due to the flexing of the spring and in a lateral direction due to the twisting of the spring around its longitudinal axis, the compliance in a lateral direction being substantially greater than the compliance in a vertical direction due to the channel shape of the spring.

NORMAN C. PICKERING.

REFERENCES CITED

The following references are of record in the file of this patent:

UNITED STATES PATENTS

| Number | Name | Date |
|---|---|---|
| 1,830,800 | McClatchie | Nov. 10, 1931 |
| 1,835,072 | McClatchie | Dec. 8, 1931 |
| 1,973,277 | Barfield | Sept. 11, 1934 |
| 1,976,874 | Brzeski | Oct. 16, 1934 |
| 1,986,583 | King | Jan. 1, 1935 |
| 2,373,181 | Fleming | Apr. 10, 1945 |
| 2,388,116 | Bruderlin | Oct. 30, 1945 |
| 2,469,933 | Schwarz | May 10, 1949 |

OTHER REFERENCES

Bell System Technical Journal, vol. 15, pp. 113–135, Magnetic Alloys of Iron, Nickel and Cobalt by G. W. Elmen (American Tel. and Tel., 1936).

The Alloys of Iron and Nickel by J. S. March, vol. 1, First edition, chapter VII, Magnetic Properties of Iron-Nickel Alloys (McGraw-Hill Book Co., 1938).